United States Patent
Kawaba

(10) Patent No.: US 7,894,360 B2
(45) Date of Patent: Feb. 22, 2011

(54) TROUBLE-FACTOR DETECTING DEVICE, TROUBLE-FACTOR DETECTING METHOD, AND COMPUTER PRODUCT

(75) Inventor: Motoyuki Kawaba, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 194 days.

(21) Appl. No.: 11/905,144

(22) Filed: Sep. 27, 2007

(65) Prior Publication Data

US 2008/0151773 A1    Jun. 26, 2008

(30) Foreign Application Priority Data

Dec. 25, 2006  (JP)  ............... 2006-348343

(51) Int. Cl.
*G01R 31/08*  (2006.01)

(52) U.S. Cl. ............... 370/252; 370/242; 709/217; 709/229

(58) Field of Classification Search ............... 370/252, 370/242; 709/217, 229
See application file for complete search history.

(56) References Cited

U.S. PATENT DOCUMENTS

| | | | |
|---|---|---|---|
| 7,502,844 B2* | 3/2009 | Garg et al. | ............... 709/223 |
| 2003/0101213 A1* | 5/2003 | Wright | ............... 709/203 |
| 2005/0289231 A1 | 12/2005 | Harada et al. | |
| 2006/0015612 A1 | 1/2006 | Shimazaki et al. | |
| 2006/0190603 A1* | 8/2006 | Anzai et al. | ............... 709/226 |
| 2006/0230122 A1 | 10/2006 | Sutou et al. | |
| 2009/0052330 A1* | 2/2009 | Matsunaga et al. | ............ 370/242 |

FOREIGN PATENT DOCUMENTS

| | | |
|---|---|---|
| JP | 2000-76198 | 3/2000 |
| JP | 2001-014189 | 1/2001 |
| JP | 2004-302664 | 10/2004 |
| JP | 2005-346414 | 12/2005 |
| JP | 2006-11683 | 1/2006 |
| JP | 2006-39662 | 2/2006 |
| JP | 2006-133820 | 5/2006 |
| JP | 2006-133983 | 5/2006 |
| JP | 2006-195709 | 7/2006 |
| JP | 2006-340050 | 12/2006 |
| WO | 2005/048118 A1 | 5/2005 |

OTHER PUBLICATIONS

Japanese Office Action issued on Apr. 9, 2009 in corresponding Japanese Patent Application 2006-348343.

* cited by examiner

*Primary Examiner*—Huy D Vu
*Assistant Examiner*—Kibrom T Hailu
(74) *Attorney, Agent, or Firm*—Fujitsu Patent Center

(57) ABSTRACT

A trouble-factor detecting device retrieves data packets on a transaction, determines whether the retrieved data is abnormal, and counts an access count and an abnormality count of the data in associated with each of resources that is accessed in the transaction. Moreover, the trouble-factor detecting device calculates an abnormality ratio of each of the resources based on the access count and the abnormality count, and selects a trouble factor that could cause a trouble in the system to be managed based on the abnormality ratio.

9 Claims, 9 Drawing Sheets

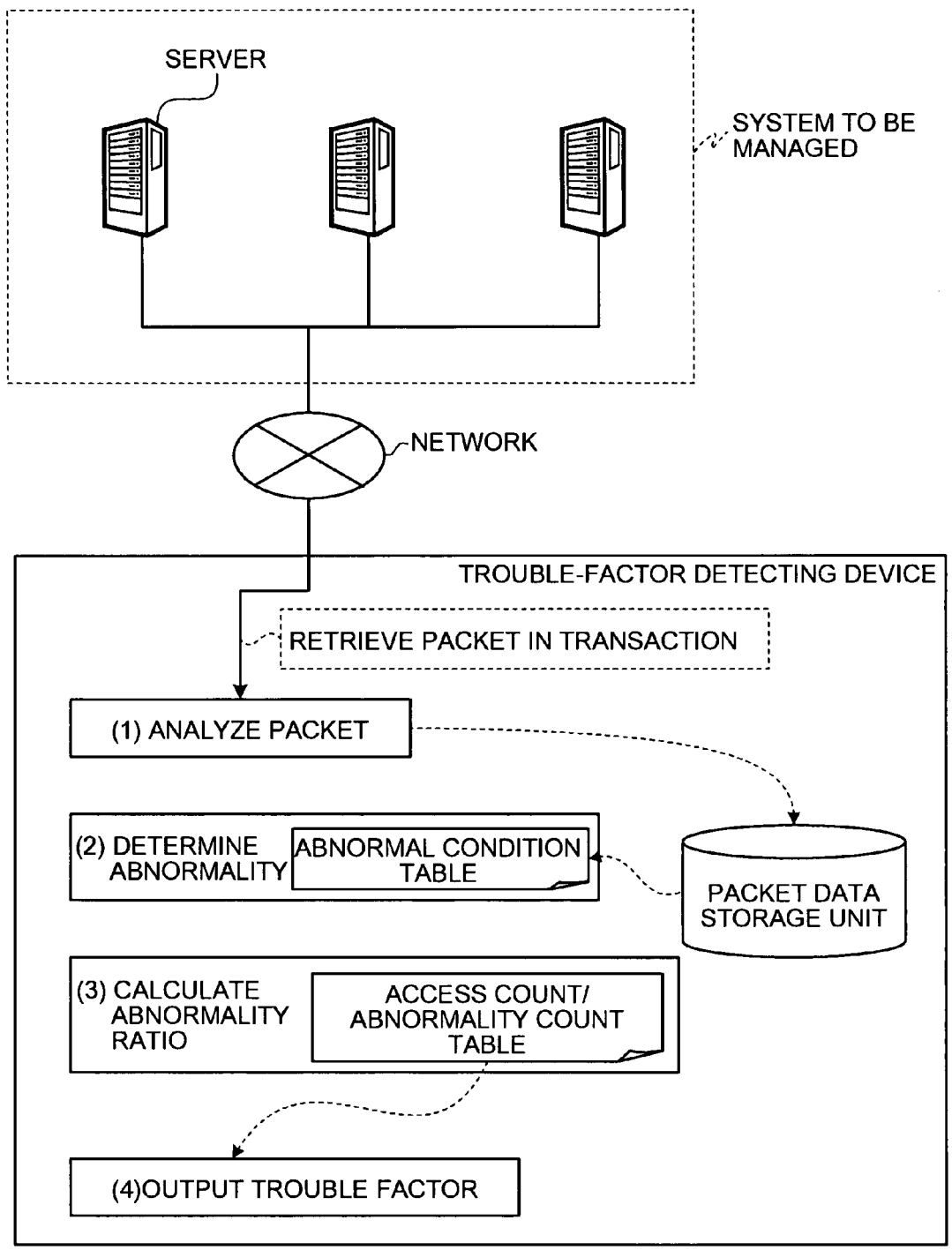

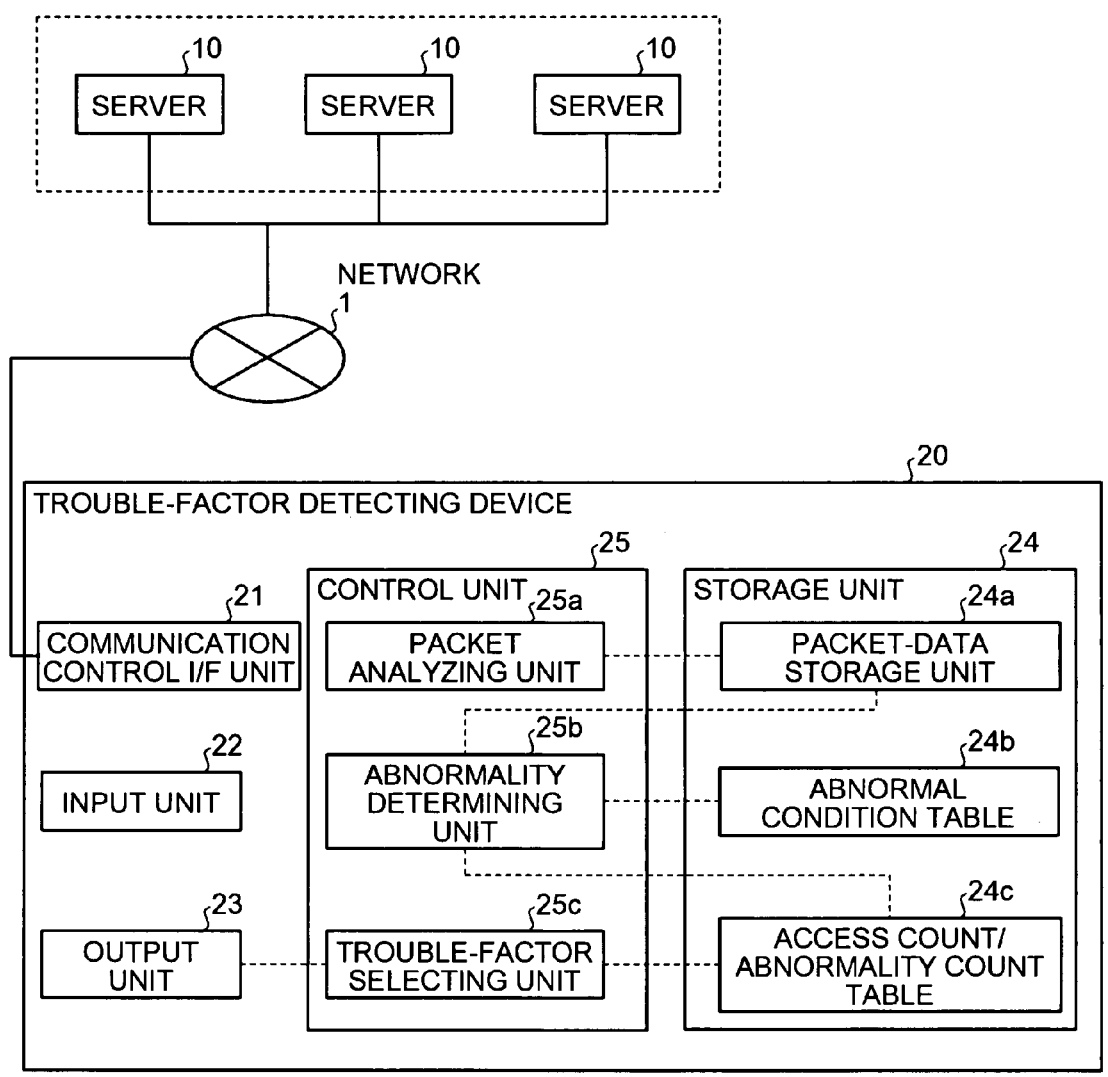

FIG.3

```
      REQUEST      REQUEST
      END TIME     DESTINATION
REQUEST       REQUEST           RETURN CODE
START         SOURCE    PROTOCOL           CONTENT
TIME

18:00:00.123  18:00:01.130  CLI   WEB2  HTTP  200  POST foo/bar/fooservlet
18:00:00.567  18:00:00.567  WEB2  AP1   IIOP  0    CLASS/OBJNAME
18:00:00.600  18:00:00.650  AP1   DB1   SQL   0    SELECT aaa FROM BARTBL
18:00:00.700  18:00:00.800  AP1   DB2   SQL   0    SELECT bbb FROM FOOTBL
```

DATA PACKET RETRIEVED IN TRANSACTION

| PROCESSING TYPE | SEQUENCE |
|---|---|
| FOO | WEB(POST foo/bar/fooservlet)<br>→IIOP(CLASS/OBJNAME)<br>→SQL(SELECT aaa FROM BARTBL)<br>→SQL(SELECT bbb FROM FOOTBL) |
| BAR | WEB (POST foo/bar/fooservlet)<br>→IIOP (CLASS 2/OBJNAME 2)<br>→SQL (SELECT aaa FROM FOOTBL) |

FIG.4

| |
|---|
| RESPONSE TIME FOR ALL FOO PROCESSES-1.5 OR LONGER |
| RESPONSE TIME FOR FOO HTTP PROCESSES-1.0 OR LONGER |
| RESPONSE TIME FOR FOO IIOP PROCESSES-0.5 OR LONGER |
| RESPONSE TIME FOR FOO SQL PROCESSES-0.08 OR LONGER |
| RETURN CODE FOR FOO HTTP PROCESSES-OTHER THAN 200 |
| RETURN CODE FOR FOO IIOP PROCESSES-OTHER THAN 0 |
| RETURN CODE FOR FOO SQL PROCESSES-OTHER THAN 0 |
| RESPONSE TIME FOR ALL BAR PROCESSES-1.2 OR LONGER |

FIG.5

| RESOURCE NAME | ACCESS COUNT | ABNORMALITY COUNT |
|---|---|---|
| POST foo/bar/fooservlet | | |
| CLASS/OBJNAME | | |
| BARTBL | | |
| FOOTBL | | |
| WEB1 | | |
| WEB2 | | |
| AP1 | | |
| AP2 | | |
| DB1 | | |
| DB2 | | |

POST foo/bar/fooservlet WEB2
CLASS/OBJNAME AP1

BARTBL DB1
FOOTBL DB2

FIG.8

| RESOURCE NAME | POST foo/bar/fooservlet | CLASS/OBJNAME | BARTBL | FOOTBL |
|---|---|---|---|---|
| ABNORMALITY RATIO | 0.4 | 0.5 | 0.3 | Y |

| RESOURCE NAME | web1 | web2 | AP1 | AP2 | DB1 | DB2 |
|---|---|---|---|---|---|---|
| ABNORMALITY RATIO | 0.5 | 0.2 | 0.3 | 0.4 | 0.2 | 0.7 |

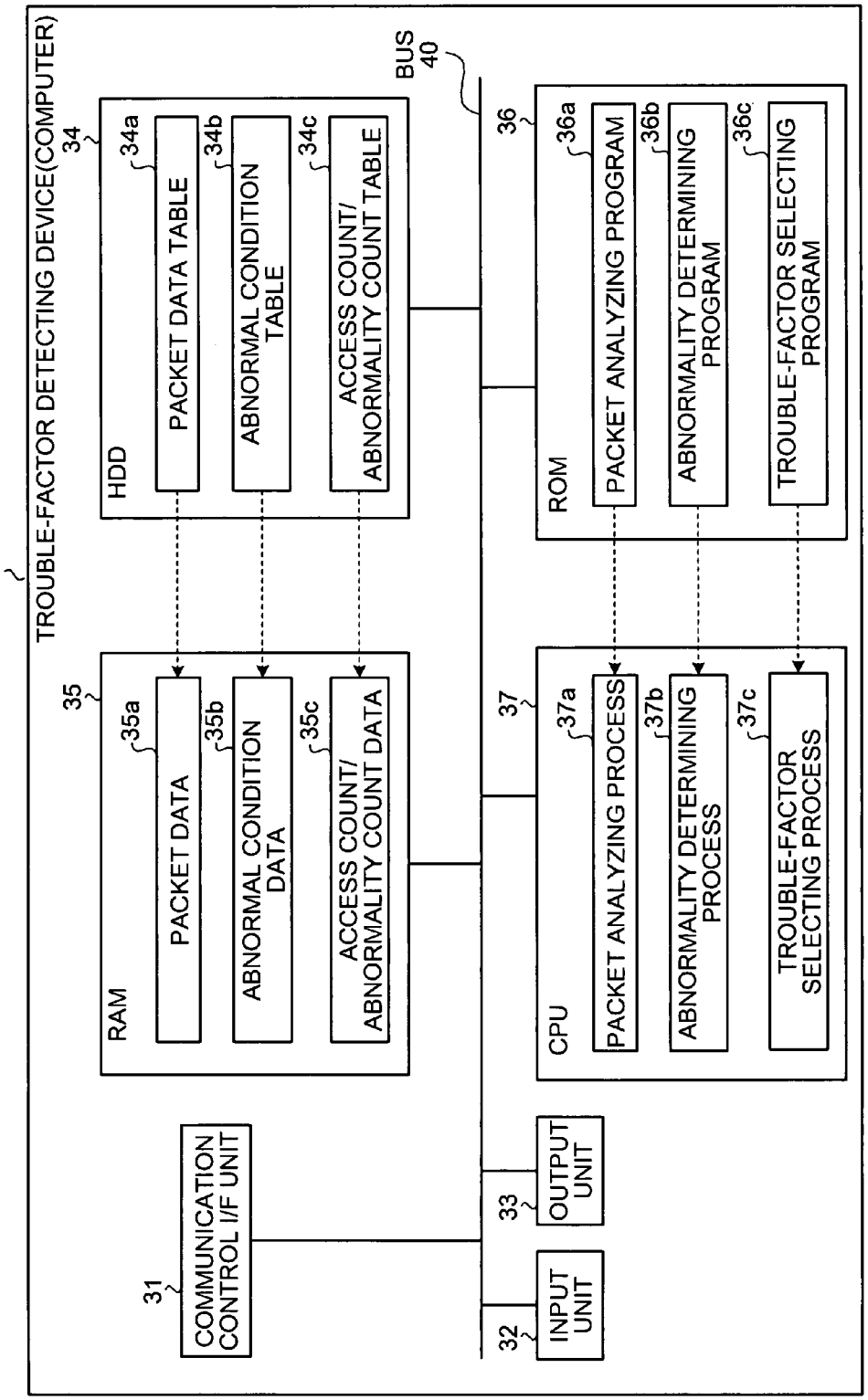

TROUBLE-FACTOR DETECTING DEVICE, TROUBLE-FACTOR DETECTING METHOD, AND COMPUTER PRODUCT

BACKGROUND OF THE INVENTION

1. Field of the Invention

The present invention relates to a technology for, detecting a trouble factor that could cause a trouble in a system where a request from a user is processed among a plurality of servers.

2. Description of the Related Art

There have disclosed technologies for detecting a trouble factor that could cause a trouble such as a delay in processing in response to a request in a web service system. For example, the Japanese Patent Application Laid-open No. 2001-14189 discloses a technology for detecting the trouble factor based on statistical data (a response time, a central processing unit (CPU) utilization, etc.) collected from each of servers used for providing the web service.

However, the above technology is inadequate to detect the trouble factor when the request is processed among a plurality of servers.

In other words, in the above technology, the trouble factor is detected based on the response time collected from each of the servers. Hence, when there detected a delay in the response time for the request processed among a plurality of servers, this technology fails to identify the server that causes the delay in the response time, that is, fails to detect the trouble factor.

SUMMARY OF THE INVENTION

It is an object of the present invention to at least partially solve the problems in the conventional technology.

According to an aspect of the present invention, a trouble-factor detecting device that detects a trouble factor that could cause a trouble in a system where a request from a user is processed among a plurality of servers includes a determining unit that retrieves data on a series of processes exchanged among the servers in response to the request, and determines whether the data is abnormal; a counting unit that counts an access count of each of resources in the servers having been accessed in the series of processes, and an abnormality count of each of the resources determined by the determining unit in the series of processes; a calculating unit that calculates, for each of the resources, an abnormality ratio based on the access count and the abnormality count; and a selecting unit that selects at least one resource from among the resources as the trouble factor based on the abnormality ratio.

According to another aspect of the present invention, a method of detecting a trouble factor that could cause a trouble in a system where a request from a user is processed among a plurality of servers includes retrieving data on a series of processes exchanged among the servers in response to the request; determining whether the data retrieved at the retrieving is abnormal; counting an access count of each of resources in the servers having been accessed in the series of processes, and an abnormality count of each of the resources determined at the determining in the series of processes; calculating an abnormality ratio based on the access count and the abnormality count for each of the resources; and selecting at least one resource from among the resources as the trouble factor based on the abnormality ratio.

According to still another aspect of the present invention, a computer-readable recording medium stores therein a computer program to implement the above method on a computer.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a schematic diagram for explaining an overview and features of a trouble-factor detecting device according to a first embodiment of the present invention;

FIG. 2 is a functional block diagram of the trouble-factor detecting device shown in FIG. 1;

FIG. 3 is a diagram for explaining data retrieved from a system to be managed shown in FIG. 1;

FIG. 4 is a diagram for explaining contents of an abnormal condition table;

FIG. 5 is a diagram for explaining contents of an access count/abnormality count table;

FIG. 8 is a diagram for explaining a calculated abnormality ratio;

FIG. 12 is a block diagram of a computer that executes a trouble factor detecting program.

DETAILED DESCRIPTION OF THE PREFERRED EMBODIMENTS

Figures 6, 7:
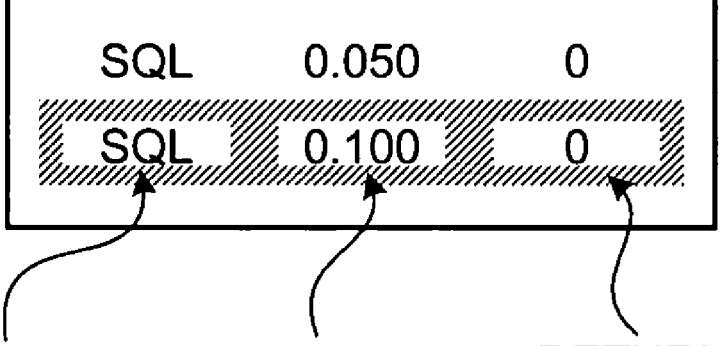
FIG. 6 is a diagram for explaining extracted resource data.
FIG. 7 is a diagram for explaining extracted performance data and return code data.

Exemplary embodiments of the present invention are described below with reference to the accompanying drawings.

An overview and salient features of a trouble-factor detecting device according to a first embodiment of the present invention is described below. FIG. 1 is a schematic diagram for explaining the overview and salient features of the trouble-factor detecting device.

The trouble-factor detecting device detects a trouble factor in a system in which a request from a user is processed among a plurality of servers. The trouble-factor detecting device can identify a source of an abnormality and selects a trouble factor that could cause a trouble even when the request is processed among a plurality of servers.

As shown in FIG. 1, the trouble-factor detecting device is communicably connected to a system to be managed that includes a plurality of servers (such as a database and an application server) over a network.

The trouble-factor detecting device retrieves data packets on a transaction, that is, a sequence of processes exchanged among the servers in response to a single request from the user. The data packets contain processing performance data (response time), return code data, and processing type data that is assigned based on a processing sequence for processing the request.

The trouble-factor detecting device analyzes the retrieved data packets (see (1) of FIG. 1). Specifically, the trouble-factor detecting device analyzes the retrieved data packets, and extracts the processing performance data, the return code data, and resource data (data on, for example, a name of a table in a server or a database that is accessed in the series of processes in response to the request, and a name of an object on an application that is accessed in the series of processes in response to the request) from the data packets. The trouble-factor detecting device stores all data extracted from each packet in a packet-data storage unit in an associated manner.

After the packet analysis, the trouble-factor detecting device reads the processing performance data and the return code data from the packet-data storage unit to determine whether the processing performance data or the return code data is abnormal (see (2) of FIG. 1). Specifically, the trouble-factor detecting device includes in advance an abnormal condition table having an abnormal condition that is used for determining, in association with the processing type data, whether the processing performance data or the return code data is abnormal. The trouble-factor detecting device reads the abnormal condition corresponding to the processing type data of the data packet, and checks the processing performance data and the return code data read from the packet-data storage unit based on the abnormal condition to determine whether the processing performance data or the return code data is abnormal.

If an abnormality is detected, the trouble-factor detecting device counts the number of access to each of the resources and the number of abnormality at each of the resources, and increases an access count and an abnormality count stored in an access count/abnormality count table by the number of access and the number of abnormality in associated with the resource data extracted as a result of the packet analysis. If no abnormality is detected, the trouble-factor detecting device counts only the number of access, and increases only the access count stored in the access count/abnormality count table by the number of access.

After the abnormality determination and the counting with regard to the processing performance data and the return code data, the trouble-factor detecting device calculates an abnormality ratio (see (3) of FIG. 1). Specifically, the trouble-factor detecting device determines whether the abnormality count of each of the resources stored in the access count/abnormality count table exceeds a threshold. If such a resource exists, the trouble-factor detecting device reads the access count and the abnormality count from the access count/abnormality count table, and calculates a ratio of the abnormality count to the access count as the abnormality ratio. If the abnormality counts of all the resources are smaller than the threshold, the trouble-factor detecting device stands by to receive the next data packet.

After the calculation of the abnormality ratio, the trouble-factor detecting device selects the trouble factor that could cause the trouble in the system to be managed from the access count/abnormality count table based on the abnormality ratio of each of the resources, and outputs the trouble factor (see (4) of FIG. 1). For example, the trouble-factor detecting device selects resource data having a largest abnormality ratio, that is, a ratio of the abnormality count to the access count closest to one, as the trouble factor, and outputs and displays the trouble factor on a predetermined output unit (for example, a display or a monitor). Alternatively, the trouble-factor detecting device can output and display the resource data having the abnormality ratio in a descending order.

The trouble-factor detecting unit repeats the process described above at every time of receiving the data packet.

Thus, even when a process in response to a request is performed by a plurality of servers linked to each other, the trouble-factor detecting device can identify a source of the abnormality, for example, a server where the abnormality occurs, to select the trouble factor that could cause the trouble. In other words, it is possible to detect the trouble factor in the system where the request is processed among a plurality of servers.

A configuration of a trouble-factor detecting device 20 according to the first embodiment is described below. FIG. 2 is a functional block diagram of the trouble-factor detecting device 20.

As shown in FIG. 2, the trouble-factor detecting device 20 is communicably connected to a plurality of servers 10 forming the system to be managed over a network 1. The trouble-factor detecting device 20 includes a communication control interface (I/F) unit 21, an input unit 22, an output unit 23, a storage unit 24, and a control unit 25.

The communication control I/F unit 21 controls communication for retrieving various data from the system to be managed. Specifically, the communication control I/F unit 21 controls communication for retrieving the data packets on a transaction, that is, a sequence of processes exchanged among the servers 10 from the system to be managed in response to a single request from the user. As shown in FIG. 3, the data packet retrieved from the system to be managed includes the processing performance data (response time), the return code data, and the processing type data (FOO, BAR, etc.) that is assigned based on a processing sequence for processing the request.

The input unit 22 works as an input receiving unit that receives various data, and includes an input device such as a keyboard, a mouse, and a microphone. The output unit 23 outputs various data, and includes an output device such as a monitor (a display, a touch panel, etc.), and a speaker. The output unit 23 outputs and displays, for example, data on a trouble factor selected by a trouble-factor selecting unit described later.

The storage unit 24 stores therein data and programs required for various processes performed by the control unit 25. The storage unit 24 includes a packet-data storage unit 24a, an abnormal condition table 24b, and an access count/abnormality count table 24c.

The packet-data storage unit 24a stores therein the data extracted from the data packet by a packet analyzing unit 25a described later. The packet-data storage unit 24a stores therein data extracted from the data packet such as the processing performance data, the return code data, and the processing type data that is assigned based on the processing sequence for processing the request, in associated manner.

The abnormal condition table 24b is a storage unit that stores therein data on an abnormal condition used for a process performed by an abnormality determining unit 25b described later. Specifically, as shown in FIG. 4, the abnormal condition table 24b contains the abnormal condition (threshold) of each of the processing type, and the abnormal condition is used for determining an abnormality of the processing performance data (response time) and the return code data.

The access count/abnormality count table 24c is a storage unit that stores therein various data used for a process performed by the abnormality determining unit 25b described later. Specifically, as shown in FIG. 5, the access count/abnormality count table 24c contains the access count and the abnormality count of each of the resources in an associated manner with the resource data (data on a name of a table in a server or a database that is accessed in the series of processes in response to the request, and a name of an object on an application that is accessed in the series of processes in response to the request) extracted from the data packet by the packet analyzing unit 25a described later.

The control unit 25 includes an internal memory for storing a predetermined control program, a computer program that defines various processes, and data required for the processes, and executes the processes by using the computer program. The control unit 25 includes the packet analyzing unit 25a, the abnormality determining unit 25b, and a trouble-factor selecting unit 25c.

The packet analyzing unit 25a analyzes the data packets received from the system to be managed in a transaction. Specifically, the packet analyzing unit 25a extracts the resource data (data on a name of a table in a server or a database that is accessed in the series of processes in response to the request, and a name of an object on an application that is accessed in the series of processes in response to the request) as shown in FIG. 6, and also extracts the processing performance data (response time) and the return code data as shown in FIG. 7. Thereafter, the packet analyzing unit 25a stores the extracted data in an associated manner in the packet-data storage unit 24a.

If the retrieved data packet (see FIG. 3) is based on a hypertext transfer protocol (HTTP) or an internet inter-ORB protocol (IIOP), the packet analyzing unit 25a extracts a content of the data packet (for example, Post foo/bar/fooservlet or CLASS/OBJNAME) as the resource data. If the data packet is based on a structured query language (SQL), the packet analyzing unit 25a extracts a table name (such as BARTBL and FOOTBL) immediately after "FROM" from the content of the data packet.

The abnormality determining unit 25b reads from the packet-data storage unit 24a the data extracted from the data packet by the packet analyzing unit 25a, and determines whether the data is abnormal in associated with each of the resources. Specifically, the abnormality determining unit 25b reads an abnormal condition corresponding to the processing type of the data packet from the abnormal condition table 24b, and checks the processing performance data (response time) and the return code data read from the packet-data storage unit 24a based on the abnormal condition to determine whether the processing performance data or the return code data is abnormal.

If determining that the data is abnormal as a result of the determination, the abnormality determining unit 25b counts the number of access to each of the resources and the number of abnormality at each of the resources, and increases the access count and the abnormality count stored in the access count/abnormality count table 24c by the number of access and the number of abnormality in associated with the resource data extracted by the packet analyzing unit 25a. If no abnormality is detected, the abnormality determining unit 25b counts only the number of access, increases only the access count stored in the access count/abnormality count table 24c by the number of access, and stands by to receive the next data packet.

After the abnormality determination and the counting with regard to the processing performance data and the return code data, the abnormality determining unit 25b calculates the abnormality ratio. Specifically, the abnormality determining unit 25b determines whether the abnormality count of each of the resources stored in the access count/abnormality count table 24c exceeds a threshold. If such a resource exists, the abnormality determining unit 25b reads the access count and the abnormality count from the access count/abnormality count table 24c, and calculates the abnormality ratio, that is, the ratio of the abnormality count to the access count as shown in FIG. 8. If the abnormality counts of all the resources are smaller than the threshold, the abnormality determining unit 25b stands by to receive the next data packet.

Figure 9:
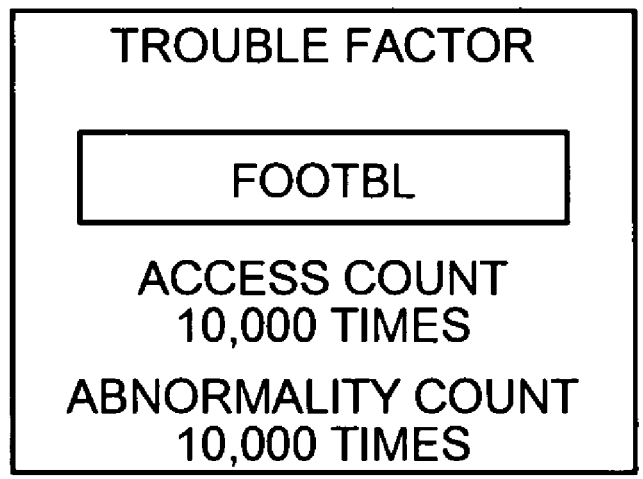
FIG. 9 is an example of output of a trouble factor.
Figure 10:
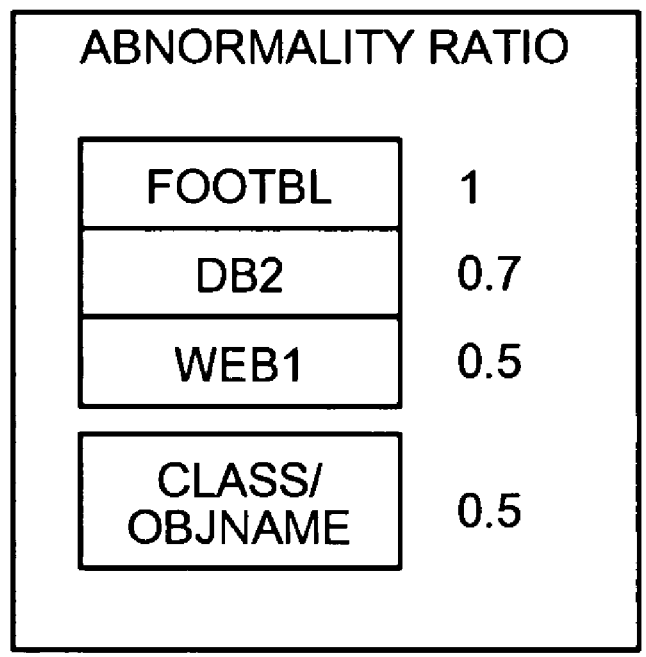
FIG. 10 is another example of output of the trouble factor.

The trouble-factor selecting unit 25c selects the trouble factor that could cause a trouble in the system to be managed from the access count/abnormality count table 24c based on the abnormality ratio (see FIG. 8). As shown in FIG. 9, the trouble-factor selecting unit 25c selects resource data having a largest abnormality ratio, that is, a ratio of the abnormality count to the access count closest to one, as the trouble factor, and outputs and displays the trouble factor on the output unit 23 (for example, a display or a monitor). Alternatively, as shown in FIG. 10, the trouble-factor selecting unit 25c outputs and displays the resource data having the abnormality ratio in a descending order.

The trouble-factor detecting device 20 can be implemented by loading the above functions on a data processing device such as a personal computer or a workstation. The trouble-factor detecting device 20 repeats the process described above at every time of receiving the data packet.

Figure 11:
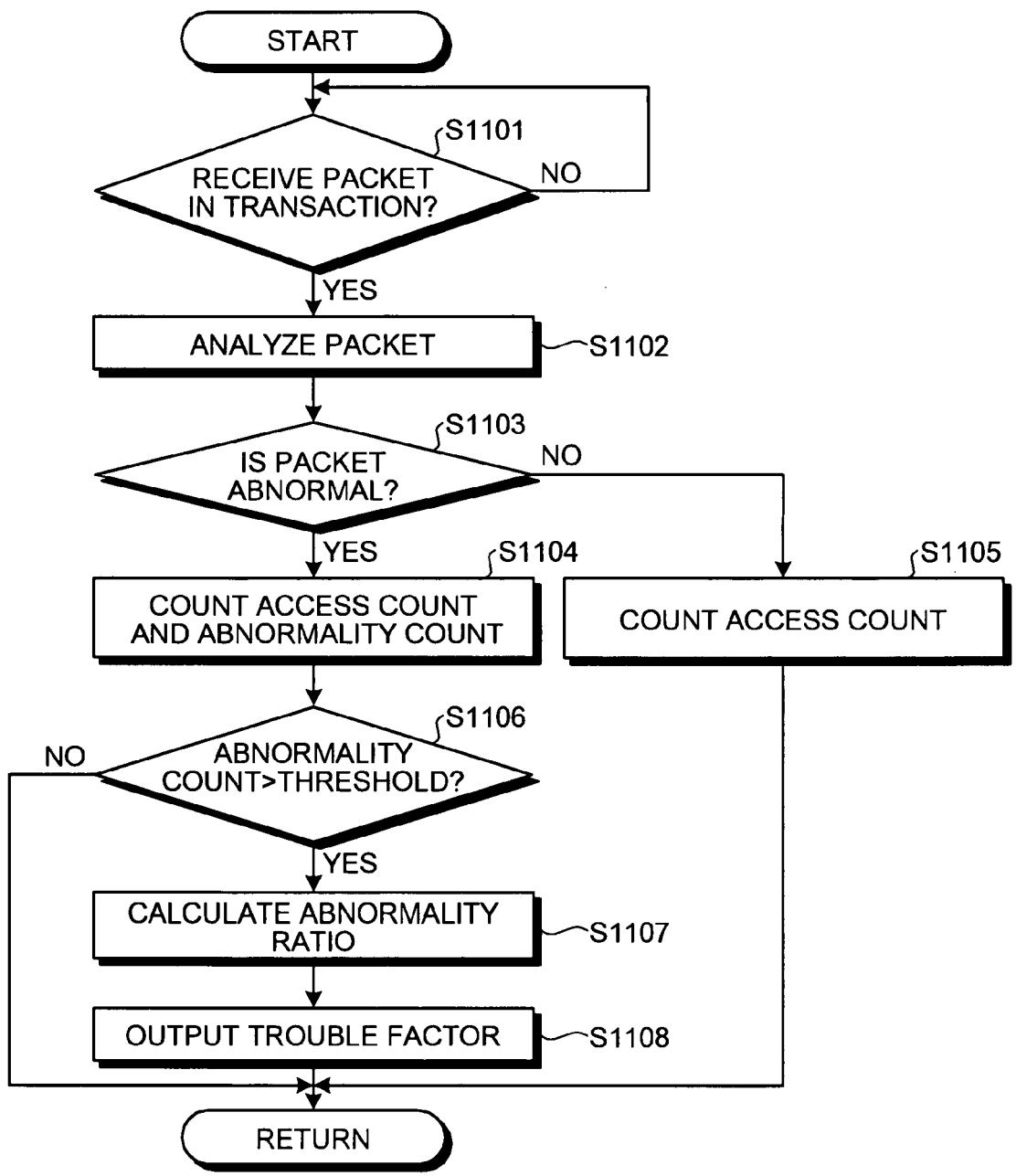
FIG. 11 is a flowchart of a process performed by the trouble-factor detecting device shown in FIG. 1.

The process performed by the trouble-factor detecting device 20 is described below with reference to FIG. 11. FIG. 11 is a flowchart of the process performed by the trouble-factor detecting device 20.

Upon receiving a data packet from the system to be managed in a transaction (Yes at step S1101), the packet analyzing unit 25a analyzes the data packet (step S1102). Specifically, as shown in FIG. 6, the packet analyzing unit 25a extracts the resource data (data on a name of a table in a server or a database that is accessed in the series of processes in response to the request, and a name of an object on an application that is accessed in the series of processes in response to the request) as shown in FIG. 6, and also extracts the processing performance data (response time) and the return code data as shown in FIG. 7. Thereafter, the packet analyzing unit 25a stores the extracted data in an associated manner in the packet-data storage unit 24a.

If the retrieved data packet (see FIG. 3) is based on the HTTP or the IIOP, the packet analyzing unit 25a extracts a content of the data packet (for example, Post foo/bar/fooservlet, CLASS/OBJNAME) as the resource data. If the data packet is based on the SQL, the packet analyzing unit 25a extracts a table name (such as BARTBL and FOOTBL) immediately after "FROM" from the content of the data packet.

The abnormality determining unit 25b reads from the packet-data storage unit 24a the data extracted from the data packet by the packet analyzing unit 25a, and determines whether the data is abnormal in associated with each of the resources (step S1103). Specifically, the abnormality determining unit 25b reads an abnormal condition corresponding to the processing type of the data packet from the abnormal condition table 24b, and checks the processing performance data (response time) and the return code data read from the packet-data storage unit 24a based on the abnormal condition to determine whether the processing performance data or the return code data is abnormal.

If an abnormality is detected (Yes at step S1103), the abnormality determining unit 25b counts the number of access to each of the resources and the number of abnormality at each of the resources, and increases the access count and the abnormality count stored in the access count/abnormality count table 24c by the number of access and the number of abnormality in associated with the resource data extracted by the packet analyzing unit 25a (step S1104). If no abnormality is detected (No at step S1103), the abnormality determining unit 25b counts only the number of access, increases only the access count stored in the access count/abnormality count table 24c by the number of access (step S1105), and stands by to receive the next data packet.

Thereafter, the abnormality determining unit 25b determines whether the abnormality count of each of the resources stored in the access count/abnormality count table 24c exceeds a threshold (step S1106). If such a resource exists (Yes at step S1106), the abnormality determining unit 25b reads the access count and the abnormality count from the access count/abnormality count table 24c; and calculates, as shown in FIG. 8, the ratio of the abnormality count to the access count as the abnormality ratio (step S1107). If the abnormality counts of all the resources are smaller than the threshold (No at step S1106), the abnormality determining unit 25b stands by to receive the next data packet.

The trouble-factor selecting unit 25c selects the trouble factor that could cause a trouble in the system to be managed from the access count/abnormality count table 24c based on the abnormality ratio (see FIG. 8), and outputs the trouble factor (step S1108). Specifically, as shown in FIG. 9, the trouble-factor selecting unit 25c selects resource data having a largest abnormality ratio, that is, a ratio of the abnormality count to the access count closest to one, as the trouble factor, and outputs and displays the trouble factor on the output unit 23 (for example, a display or a monitor). Alternatively, as shown in FIG. 10, the trouble-factor selecting unit 25c outputs and displays the resource data in a descending order.

According to the first embodiment, the trouble-factor detecting device retrieves data packets on a transaction, that is, a sequence of processes exchanged among the servers in response to a single request from the user, analyzes the retrieved data packets, counts the access count and the abnormality count of the data in associated with each of the resources that is accessed in the series of processes (for example, a name of a table in a server or a database that is accessed, or a name of an object on an application that is accessed), calculates the abnormality ratio of each of the resources based on the access count and the abnormality count, and selects the trouble factor based on the abnormality ratio. As a result, even when a process in response to a request is performed by a plurality of servers linked to each other, the trouble-factor detecting device can identify a source of the abnormality, for example, a server where the abnormality occurs, to select the trouble factor that could cause the trouble. In other words, it is possible to detect the trouble factor in the system where the request is processed among a plurality of servers.

According to the first embodiment, the trouble-factor detecting device stores the abnormal condition in associated with each type of the sequence of processes in response to the request (that is, a processing type based on the sequence of processes), and determines whether the retrieved data packets on the transaction, that is, the series of processes are abnormal based on the abnormal condition. This makes it possible to determine each of the data packets in detail.

The trouble-factor detecting device determines whether the data is abnormal in associated with each of the resources, calculates the abnormality ratio, and selects the trouble factor at every time of receiving the data packet according to the first embodiment. However, it is allowable, for example, that the trouble-factor detecting device determines whether the data is abnormal at every time of receiving the data packet, and, upon receiving an instruction from an administrator periodically, calculates the abnormality ratio of each of the resources to select the trouble factor.

Although exemplary embodiments have been described above, various modifications can be made in addition to the above embodiments. Some of such modifications are described below.

(1) Expected Trouble Notification

If it is determined, while the request in queue, that a resource with a high abnormality ratio is to be accessed in the series of processes in response to the request based on the processing type, it is allowable to notify a likeability of causing a trouble. This makes it possible to take a measure to cope with the expected trouble.

(2) Configuration

The constituent elements of the trouble-factor detecting device 20 shown in FIG. 2 are merely conceptual and need not be configured as illustrated. In other words, the constituent elements, as a whole or in part, can be separated or integrated either functionally or physically based on various types of loads or use conditions. For example, the process functions of the abnormality determining unit 25b can be separated into the process function of determining the abnormality and the process function of calculating the abnormality ratio. The process functions (such as the packet analyzing function, the trouble-factor extracting function, (see FIG. 11)) performed by the trouble-factor detecting device 20 can be entirely or partially realized by a CPU or a computer program that are analyzed and executed by the CPU, or realized as hardware by wired logic.

(3) Trouble-factor Detecting Program

The various processes (see FIG. 11) performed by the trouble-factor detecting device according to the first embodiment can be realized by causing a computer system such as a personal computer or a workstation to execute a prepared program. A computer that executes a trouble-factor detecting program to implement functions identical to the trouble-factor detecting device according to the first embodiment is described below with reference to FIG. 12. FIG. 12 is a block diagram of a computer that executes the trouble-factor detecting program.

As shown in FIG. 12, a computer 30 that functions as a trouble-factor detecting device includes a communication control I/F unit 31, an input unit 32, an output unit 33, a hard disk drive (HDD) 34, a random access memory (RAM) 35, a read-only memory (ROM) 36, a CPU 37, those connected to each other via a bus 40. The communication control I/F unit 31, the input unit 32, and the output unit 33 correspond to the communication control I/F unit 21, the input unit 22, and the output unit 23 of the trouble-factor detecting device 20 shown in FIG. 2, respectively.

The ROM 36 stores therein the trouble-factor detecting program that causes the computer to implement the functions similar to those of the trouble-factor detecting device according to the above embodiments. In other words, as shown in FIG. 12, the ROM 36 stores therein a packet analyzing program 36a, an abnormality determining program 36b, and a trouble-factor selecting program 36c in advance. The computer programs 36a to 36c can be integrated or separated as appropriate in a similar manner that the constituent components of the trouble-factor detecting device 20 shown in FIG. 2 can be integrated or separated as appropriate. A non-volatile RAM can be used in place of the ROM 36.

When the CPU 37 reads the computer programs 36a to 36c from the ROM 36 and executes the read computer programs 36a to 36c to implement a packet analyzing process 37a, an abnormality determining process 37b, and a trouble-factor selecting process 37c. The packet analyzing process 37a, the abnormality determining process 37b, and the trouble-factor selecting process 37c correspond to the packet analyzing unit 25a, the abnormality determining unit 25b, and the trouble-factor selecting unit 25c of the trouble-factor detecting device 20 shown in FIG. 2, respectively.

The HDD 34 stores therein a packet data table 34a, an abnormal condition table 34b, and an access count/abnormality count table 34c. The packet data table 34a, the abnormal condition table 34b, and the access count/abnormality count table 34c correspond to the packet-data storage unit 24a, the abnormal condition table 24b, and the access count/abnormality count table 24c shown in FIG. 2, respectively. The CPU 37 reads packet data 35a, abnormal condition data 35b, and access count/abnormality count data 35c from the packet data table 34a, the abnormal condition table 34b, the access count/abnormality count table 34c, respectively, stores the read data in the RAM 35, and performs various processes based on the packet data 35a, the abnormal condition data 35b, and the access count/abnormality count data 35c stored in the RAM 35.

It is not necessary that the computer programs 36a to 36c are stored in the ROM 36 in advance. The computer programs 36a to 36c can also be stored in a portable physical medium that can be inserted into the computer 30, such as a flexible disk (FD), a compact disk-read only memory (CD-ROM), a magneto optic (MO) disk, a digital versatile disk (DVD), and an integrated circuit (IC) card, in a fixed physical medium that can be installed in or externally attached to the computer 30, or in another computer (or server) that is connected to the computer 30 over a public line, Internet, local area network (LAN), wide area network (WAN), etc. The computer 30 can read the computer programs 36a to 36c from these mediums and execute the various processes.

According to an embodiment of the present invention, even when a process in response to a request is performed by a plurality of servers linked to each other, the trouble-factor detecting device can identify a source of the abnormality, for example, a server where the abnormality occurs, to select the trouble factor that could cause the trouble. In other words, it is possible to detect the trouble factor in the system where the request is processed among a plurality of servers.

Furthermore, the trouble-factor detecting device stores the abnormal condition in associated with each type of the sequence of processes in response to the request (that is, a processing type based on the sequence of processes), and determines whether the retrieved data packets on the transaction, that is, the series of processes are abnormal based on the abnormal condition. This makes it possible to determine each of the data packets in detail.

Moreover, it is possible to take a measure to cope with the expected trouble.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A trouble-factor detecting device that detects a trouble factor in a system where a request is processed among a plurality of servers, the device comprising:
   a retrieving unit that retrieves, from data obtained from the system, processing performance information, return code information, processing type information assigned to a transaction that the request is processed among the servers, and resource information indicative of a plurality of resources accessed in the transaction, the data being exchanged among the servers in the transaction;
   a determining unit that determines whether each of the processing performance information and the return code information retrieved by the retrieving unit is abnormal or not based on an abnormal condition corresponding to the processing type information retrieved;
   a counting unit that counts, for each of the resources accessed in the transaction, an access count and an abnormality count of an abnormality determination that the determining unit determines when at least one of the processing performance information and the return code information is abnormal;
   a calculating unit that calculates, for each of the resources, an abnormality ratio based on the access count counted and the abnormality count counted; and
   a selecting unit that selects at least one resource from among the resources as the trouble factor that causes the data to be abnormal based on the abnormality ratio calculated by the calculating unit.

2. The trouble-factor detecting device according to claim 1, wherein the abnormal condition includes a threshold about whether each of the processing performance information and the return code information is abnormal or not, and
   the determining unit determines whether each of the processing performance information and the return code information is abnormal based on the threshold.

3. The trouble-factor detecting device according to claim 1, further comprising a notifying unit that notifies a likelihood of causing the data to be abnormal before the request is processed among the servers, when a resource with high abnormality ratio is to be accessed.

4. A method of detecting a trouble factor in a system where a request is processed among a plurality of servers, the method comprising:
   retrieving, from data obtained from the system, processing performance information, return code information, processing type information assigned to a transaction that the request is processed among the servers, and resource information indicative of a plurality of resources accessed in the transaction, the data being exchanged among the servers in the transaction;
   determining whether each of the processing performance information and the return code information retrieved at the retrieving is abnormal or not based on an abnormal condition corresponding to the processing type information retrieved;
   counting, for each of the resources accessed in the transaction, an access count and an abnormality count of an abnormality determination when the determining determines that at least one of the processing performance information and the return code information is abnormal;
   calculating an abnormality ratio based on the access count counted and the abnormality count counted for each of the resources; and
   selecting at least one resource from among the resources as the trouble factor that causes the data to be abnormal based on the abnormality ratio calculated at the calculating.

5. The method according to claim 4, wherein the abnormal condition includes a threshold about whether each of the processing performance information and the return code information is abnormal or not, and
   the determining includes determining whether each of the processing performance information and the return code information is abnormal based on the threshold.

6. The method according to claim 4, further comprising notifying a likelihood of causing the data to be abnormal before the request is processed among the servers, when a resource with high abnormality ratio is to be accessed.

7. A computer-readable recording medium that stores therein a computer program to implement a method of detecting a trouble factor in a system where a request is processed among a plurality of servers, the computer program causing the computer to execute:
- retrieving, from data obtained from the system, processing performance information, return code information, processing type information assigned to a transaction that the request is processed among the servers, and resource information indicative of a plurality of resources accessed in the transaction, the data being exchanged among the servers in the transaction;
- determining whether each of the processing performance information and the return code information retrieved at the retrieving is abnormal or not based on an abnormal condition corresponding to the processing type information retrieved;
- counting, for each of the resources accessed in the transaction, an access count and an abnormality count of an abnormality determination when the determining determines that at least one of the processing performance information and the return code information is abnormal;
- calculating an abnormality ratio based on the access count counted and the abnormality count counted for each of the resources; and
- selecting at least one resource from among the resources as the trouble factor that causes the data to be abnormal based on the abnormality ratio calculated at the calculating.

8. The computer-readable recording medium according to claim 7, wherein the abnormal condition includes a threshold about whether each of the processing performance information and the return code information is abnormal or not, and
- the determining includes determining whether each of the processing performance information and the return code information is abnormal based on the threshold.

9. The computer-readable recording medium according to claim 7, wherein the computer program further causes the computer to execute notifying a likelihood of causing the data to be abnormal before the request is processed among the servers, when a resource with high abnormality ratio is to be accessed.

* * * * *